(12) United States Patent
Kotani

(10) Patent No.: US 10,324,280 B2
(45) Date of Patent: Jun. 18, 2019

(54) MICROSCOPE SYSTEM

(71) Applicant: OLYMPUS CORPORATION, Hachioji-shi, Tokyo (JP)

(72) Inventor: Tadashi Kotani, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 1 day.

(21) Appl. No.: 15/593,221

(22) Filed: May 11, 2017

(65) Prior Publication Data

US 2017/0329117 A1  Nov. 16, 2017

(30) Foreign Application Priority Data

May 16, 2016  (JP) .................................. 2016-097600

(51) Int. Cl.
| | |
|---|---|
| *G02B 21/06* | (2006.01) |
| *G02B 21/08* | (2006.01) |
| *F21V 8/00* | (2006.01) |
| *G02B 21/36* | (2006.01) |
| *H04N 5/238* | (2006.01) |
| *G02B 6/14* | (2006.01) |

(52) U.S. Cl.
CPC ......... *G02B 21/082* (2013.01); *G02B 6/0008* (2013.01); *G02B 6/14* (2013.01); *G02B 21/36* (2013.01); *H04N 5/238* (2013.01)

(58) Field of Classification Search
CPC ...... G02B 21/082; G02B 6/14; G02B 6/0008; G02B 21/36; H04N 5/238
See application file for complete search history.

(56) References Cited

U.S. PATENT DOCUMENTS

| | | | | |
|---|---|---|---|---|
| 6,137,573 A | * | 10/2000 | Luke .................. | G01D 5/35303 356/453 |
| 2005/0264875 A1 | * | 12/2005 | Engelhardt .......... | G02B 21/002 359/368 |
| 2008/0073518 A1 | * | 3/2008 | Itoh ........................ | B82Y 20/00 250/306 |
| 2009/0174937 A1 | * | 7/2009 | Holy ...................... | G02B 21/08 359/382 |
| 2010/0111768 A1 | | 5/2010 | Banerjee et al. | |

(Continued)

FOREIGN PATENT DOCUMENTS

| | | |
|---|---|---|
| JP | 61013803 U | 1/1986 |
| JP | 02042407 A | 2/1990 |

(Continued)

OTHER PUBLICATIONS

R. Hard et al., "Phase-Randomized Laser Illumination for Microscopy," J. Cell Sci. 23, (1977), pp. 335-343.

(Continued)

*Primary Examiner* — Howard D Brown, Jr.
(74) *Attorney, Agent, or Firm* — Holtz, Holtz & Volek PC

(57) ABSTRACT

Provided is a microscope system including: an optical fiber in which laser light emitted from a light-source apparatus propagates; a microscope that irradiates a specimen with the laser light propagated in the optical fiber and that obtains an image of the specimen; a mode-scrambling device portion that causes elastic waves to propagate in the optical fiber to form elastic wave interference fringes in the optical fiber; and a control device that controls the driving of the mode-scrambling device.

11 Claims, 9 Drawing Sheets

(56) References Cited

U.S. PATENT DOCUMENTS

| | | | |
|---|---|---|---|
| 2011/0286232 A1 | 11/2011 | Dougherty et al. | |
| 2015/0022781 A1* | 1/2015 | Wada | A61B 3/1173 351/221 |
| 2015/0211997 A1* | 7/2015 | Dake | G02B 21/0032 250/550 |
| 2016/0003740 A1* | 1/2016 | Tao | G01N 21/45 250/459.1 |
| 2016/0158886 A1* | 6/2016 | Kumar | B23K 26/06 219/121.61 |
| 2017/0276610 A1* | 9/2017 | Fujita | G01J 3/44 |
| 2017/0329117 A1* | 11/2017 | Kotani | G02B 6/0008 |

FOREIGN PATENT DOCUMENTS

| | | |
|---|---|---|
| JP | 2003156698 A | 5/2003 |
| JP | 2006301067 A | 11/2006 |
| JP | 2008112783 A | 5/2008 |
| JP | 2009092878 A | 4/2009 |
| JP | 2009532031 A | 9/2009 |
| JP | 2013525847 A | 6/2013 |
| WO | 2007123744 A2 | 11/2007 |
| WO | 2011133804 A2 | 10/2011 |

OTHER PUBLICATIONS

Yosuke Fujimaki et al., "Reduction of speckle contrast in multimode fibers using piezoelectric vibrator," Proc. of SPIE vol. 8960, pp. 89601S-1 to 89601S-7.

\* cited by examiner

MICROSCOPE SYSTEM

CROSS-REFERENCE TO RELATED APPLICATIONS

This application is based on Japanese Patent Application No. 2016-097600, the content of which is incorporated herein by reference.

TECHNICAL FIELD

The present invention relates to a microscope system.

BACKGROUND ART

In the related art, there is a known fiber-illumination type microscope in which a light source and a microscope body are connected by an optical fiber (for example, see Patent Literature 1). With illumination using an optical fiber, as with the microscope described in Patent Literature 1), the illumination intensity at a specimen surface may not be uniform, and patchy noise may be observed in the image due speckles caused by light interference between different transmission modes in a multimode fiber.

Thus, by employing a mode scrambler on the optical fiber, a mode scrambling effect due to refractive index changes in the optical fiber is used to give uniform radiation of the illumination light at the specimen surface (for example, see Patent Literature 2 and Patent Literature 3).

Known mode scramblers include, for example, those in which the optical fiber is curved or wound (for example, see Patent Literature 4), those in which external pressure is applied to the optical fiber to give a stress thereto (for example, see Patent Literature 5), those in which vibrations are applied to the optical fiber (for example, see Patent Literature 6, 7 and 8), and so forth. In addition, a technique in which an effect identical to mode scrambling is obtained by disposing a diffusion plate or the like in the optical path and moving the diffusion plate is also known (for example, see Non Patent Literature 1).

CITATION LIST

Patent Literature

{PTL 1}
Japanese Unexamined Patent Application, Publication No. 2006-301067
{PTL 2}
Japanese Unexamined Patent Application, Publication No. 2009-092878
{PTL 3}
Japanese Translation of PCT International Application, Publication No. 2009-532031
{PTL 4}
Japanese Unexamined Patent Application, Publication No. HEI 02-042407
{PTL 5}
Japanese Unexamined Patent Application, Publication No. SHO 61-013803
{PTL 6}
Japanese Unexamined Patent Application, Publication No. 2003-156698
{PTL 7}
Japanese Translation of PCT International Application, Publication No. 2013-525847
{PTL 8}
Japanese Unexamined Patent Application, Publication No. 2008-112783

Non Patent Literature

{NPL 1}
R. Hard, R. Zeh, and R. D. Allen, "Phase-Randomized Laser Illumination For Microscopy", J. Cell Sci. 23, 335 (1977)

SUMMARY OF INVENTION

An aspect of the present invention is a microscope system including: an optical fiber in which illumination light emitted from a light source propagates; a microscope that irradiates a specimen with the illumination light propagated via the optical fiber and that obtains an image of the specimen; an interference-fringes forming portion that causes elastic waves to propagate in the optical fiber to form interference fringes of the elastic waves in the optical fiber; and a control unit that controls driving of the interference-fringes forming portion.

DESCRIPTION OF EMBODIMENTS

First Embodiment

A microscope system according to a first embodiment of the present invention will be described below with reference to the drawings.

Figure 1:
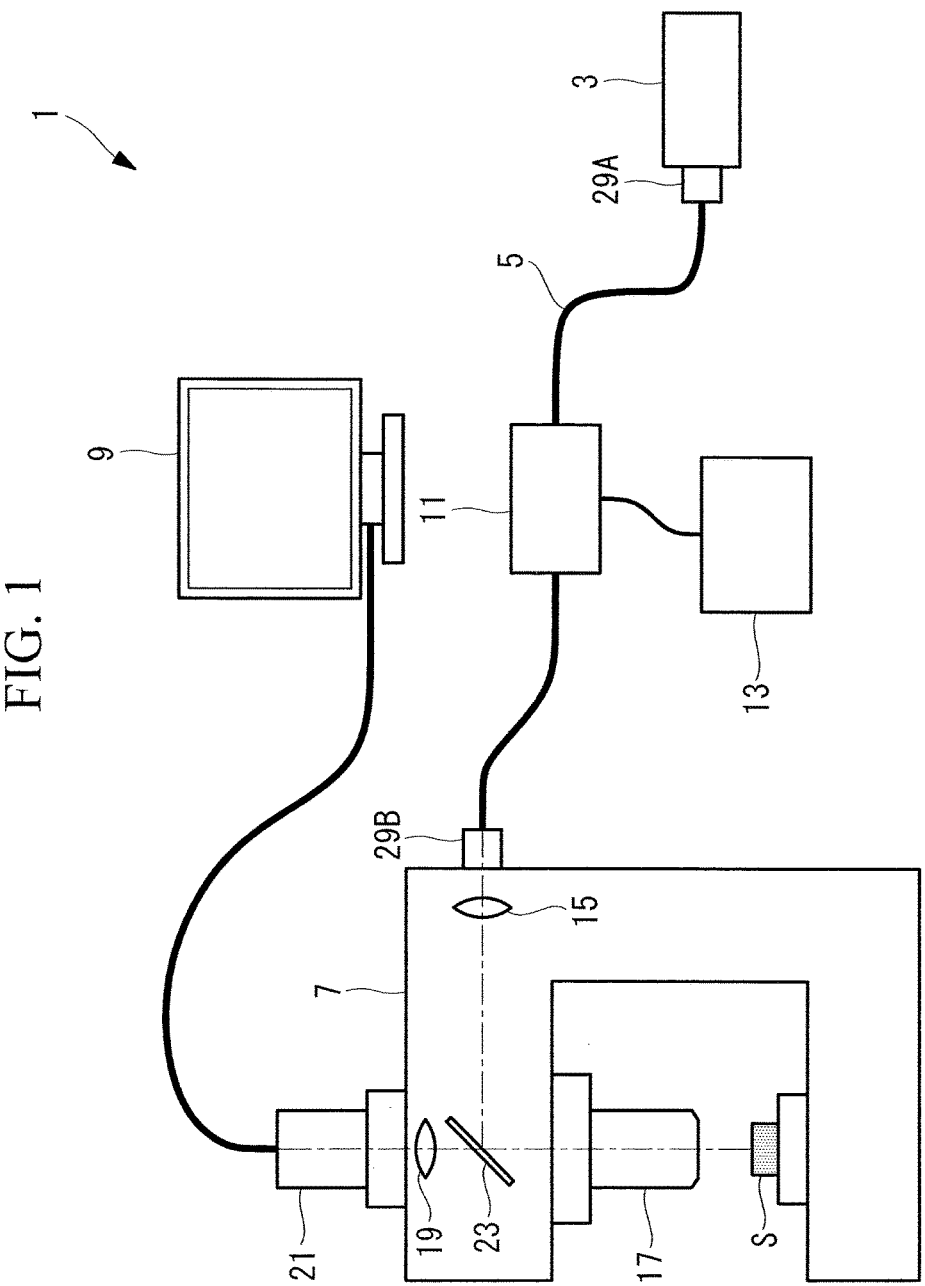
FIG. 1 is a schematic diagram showing the configuration of a microscope system according to a first embodiment of the present invention.

As shown in FIG. 1, the microscope system 1 according to this embodiment includes a light source apparatus 3 that emits laser light (illumination light), an optical fiber 5 in which the laser light emitted from the light-source apparatus 3 propagates, a microscope 7 that irradiates a specimen S with the laser light propagated via the optical fiber 5 and that obtains an image of the specimen S, a monitor 9 that displays the image obtained by the microscope 7 and so forth, a mode-scrambling device (interference-fringes forming portion) 11 that forms elastic wave interference fringes in the optical fiber 5, and a control device (control unit) 13 that controls the driving of the mode-scrambling device 11.

The light-source apparatus 3 includes a laser light source (not illustrated) that generates laser light and an optical system (not illustrated) that introduces the laser light generated in the laser light source into the optical fiber 5.

The microscope 7 includes a projection lens 15 that condenses the laser light guided by the optical fiber 5, an objective lens 17 that irradiates the specimen S with the laser light condensed by the projection lens 15 and that collects observation light returning from the specimen S as a result of being irradiated with the laser light, an image-acquisition lens 19 that images the observation light collected by the objective lens 17, and a camera (image-acquisition unit) 21 that captures the observation light imaged by the image-acquisition lens 19.

The microscope 7 is also provided with a half-mirror 23 that reflects the laser light condensed by the projection lens 15 towards the objective lens 17 and that transmits, towards the image-acquisition lens 19, the observation light collected by the objective lens 17 and returning via the light path of the laser light.

Figure 2:
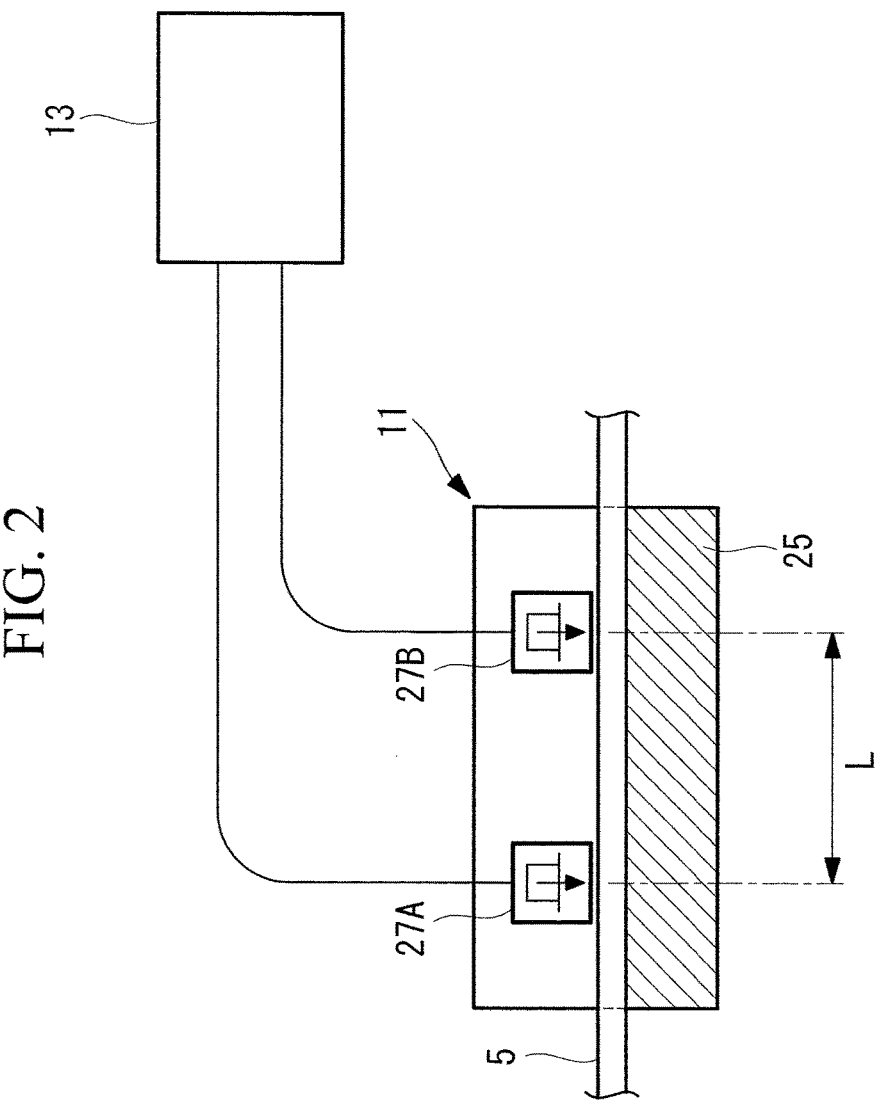
FIG. 2 is a schematic diagram showing the configuration of a mode-scrambling device in FIG. 1.

The optical fiber 5 passes through the inside of the mode-scrambling device 11. As shown in FIG. 2, this mode-scrambling device 11 includes a holding portion 25 that holds the optical fiber 5 in the interior thereof and two transducers 27A and 27B, which are electromechanical conversion elements that excite elastic waves, such as ultrasonic waves, in the optical fiber 5.

Figure 3:
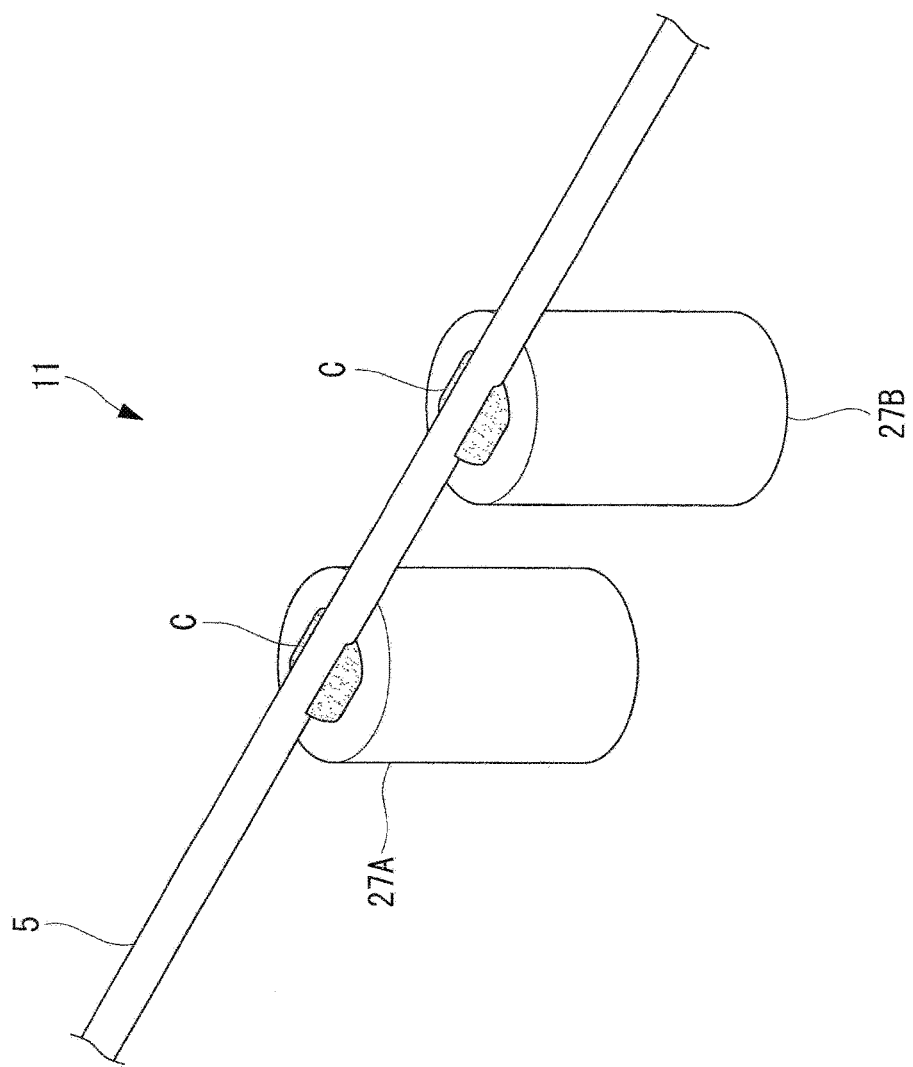
FIG. 3 is a perspective view showing an example of a securing part in FIG. 2, for securing two transducers and an optical fiber.

The two transducers 27A and 27B are disposed with a distance L therebetween in the longitudinal direction of the optical fiber 5. Also, as shown in FIG. 3, for example, these transducers 27A and 27B are formed in cylindrical shapes, and the optical fiber 5 is secured to one of the end faces of each transducer in the central axis direction thereof with an adhesive C.

In the event that gaps occur between the transducers 27A and 27B and the optical fiber 5, it is preferable that the gap be filled with an ultrasonic couplant or the like so that the transducers 27A and 27B are placed in tight contact. By doing so, it is possible to allow the elastic waves to efficiently propagate from the transducers 27A and 27B to the optical fiber 5. Instead of the adhesive C, for example, the optical fiber 5 may be pressed against the end faces of the transducers 27A and 27B and secured thereto with a plate-shaped member for applying pressure.

The transducers 27A and 27B generate elastic waves with frequencies of 20 kHz or higher, under the control of the control device 13. Then, the transducers 27A and 27B cause the elastic waves to propagate in the optical fiber 5, so that elastic wave interference fringes are formed inside the optical fiber 5.

By setting the driving frequencies of the transducers 27A and 28B to 20 kHz or higher, even if the elastic waves leak out from the mode-scrambling device 11, the generation of audible sound can be suppressed, thus preventing user discomfort. In the case of image-capturing with a camera, generally, it is necessary to make the period at which mode scrambling is performed shorter than the exposure time and, for example, even when the exposure time is extremely short, such as about 1 ms, so long as the frequency of the elastic waves is 20 kHz or higher, it is possible to obtain an adequate mode-scrambling effect under the conditions in this application.

One end of the optical fiber 5 is connected to the light source apparatus 3 with an optical connector 29A, such as an FC connector or the like, an other end thereof is connected to the microscope 7 with an optical connector 29B, such as the same type of FC connector or the like. This optical fiber 5 may be stripped at the parts that are in contact with the two transducers 27A and 27B or over the entire region of the part that passes through the mode-scrambling device 11. By doing so, the elastic waves can be easily made to propagate into the optical fiber 5 from the transducers 27A and 27B. In addition, the optical fiber 5 can be arranged to be attachable to and detachable from the mode-scrambling device 11 by providing optical fiber connectors, such as FC connectors, at the input and output portions of the mode-scrambling device 11.

The control device 13 includes a memory (not illustrated) in which a driving program or the like for driving each of the transducers 27A and 27B is stored, and a processor (not illustrated) having a function for reading the program stored in the memory and executing the program. By executing the driving program stored in the memory, the processor inputs driving signals of frequencies f1 and f2 to the transducers 27A and 27B, respectively.

The frequencies f1 and f2 and the distance L between the transducers 27A and 27B are set so as to satisfy the relationships $2f1L>v$ and $2f2L>v$, where v is the velocity of the elastic waves in the optical fiber 5. Satisfying these relationships means that the distance L between the transducers 27A and 27B is longer than half of the wavelength of the elastic waves propagating in the optical fiber 5. By making the distance L between the transducers 27A and 27B longer than half of the wavelength of the elastic waves, it is possible to improve the mode-scrambling effect compared with a case where a single transducer is used.

In this embodiment, based on the driving signals, the control device 13 causes each of the transducers 27A and 27B to generate elastic waves of the same frequency (f1=f2), which are made to propagate in the optical fiber 5. Here, in FIG. 2, when the longitudinal direction of the optical fiber 5 is defined as the X-axis, and the position of one transducer 27A is defined as the origin, the X position of the other transducer 27B is defined as L.

If the frequencies of the driving signals are the same value f and are in phase, the elastic waves propagated from the two transducers 27A and 27B form mutually constructive interference fringes at positions that satisfy the following conditional expression:

$$|X(L-x)|=n\times(v/f)$$

where n is an integer equal to 0 or greater.

In the space flanked by the two transducers 27A and 27B, this elastic wave is also a standing wave whose position does not change.

By executing the driving program, the processor in the control device 13 also controls the timing at which the elastic waves are generated in the mode-scrambling device 11. For example, the processor outputs driving signals only at the time of image-capturing with the camera 21 or only at the time of visual observation by the user, so as to make the transducers generate elastic waves. Accordingly, the load exerted on the optical fiber 5 by causing standing waves to propagate in the optical fiber 5 can be reduced, which suppresses damage to the optical fiber 5.

The operation of the microscope system 1 configured in this way will now be described.

When observing the specimen S with the microscope system 1 according to this embodiment, first, laser light is generated in the light-source apparatus 3, and the laser light is guided to the microscope 7 by the optical fiber 5.

The laser light guided to the microscope 7 is condensed by the projection lens 15, is reflected by the half-mirror 23, and is radiated onto the specimen S by the objective lens 17. The observation light returning from the specimen S as a result of irradiation with the laser light is collected by the objective lens 17, passes through the half-mirror 23, is imaged by the image-acquisition lens 19, and is captured by the camera 21. The image of the specimen S obtained by the camera 21 is displayed on the monitor 9. Therefore, the user can observe the specimen S using the image displayed on the monitor 9.

In this case, the mode-scrambling device 11 is driven by the control device 13, so that elastic waves of the same frequency f from the two transducers 27A and 27B propagate in the optical fiber 5, and elastic wave interference fringes are formed in the optical fiber 5. Accordingly, the refractive index in the optical fiber 5 is changed, and the laser light emitted from the optical fiber 5 is made uniform by means of the so-called mode-scrambling effect, to that it is possible to obtain a high-precision image of the specimen S.

Here, with the mode-scrambling device 11, since the optical fiber 5 is not mechanically deformed and vibrations are not applied to the optical fiber 5, the generation of sound and vibrations that would have an influence on the observation is suppressed, and the physical load exerted on the optical fiber 5 is reduced, thus reducing damage to the optical fiber 5. In addition, by controlling the driving of the mode-scrambling device with the control device 13, it is possible to make the mode-scrambling effect adjustable.

Therefore, with the microscope system 1 according to this embodiment, the mode-scrambling effect is efficiently utilized with a simple configuration that involves merely forming interference fringes by causing elastic waves to propagate in the optical fiber 5 with the mode-scrambling device 11, thus realizing reduced damage to the optical fiber 5, uniform laser light irradiation on the specimen surface, and removal of spectral noise, which enable high-precision observation of the specimen S.

If silica glass is used as the material of the optical fiber 5, the elastic waves have a transverse wave velocity of about 3700 to 3800 m/s and a longitudinal wave velocity of about 5900 to 6000 m/s. Considering the velocity of 3700 m/s under the condition that the wavelength is shortest for the same frequency, the frequency of 20 kHz corresponds to a wavelength of 18.5 cm. Taking account of the attenuation of the elastic waves, a more narrow spacing between the two transducers 27A and 27B is preferable, and a higher elastic wave frequency is preferable. Specifically, a frequency of f=100 kHz or higher and a distance L between the transducers 27A and 27B of a few centimeters or less is more preferable.

In this embodiment, it has been assumed that the two transducers 27A and 27B are used; however, three or more transducers may be used. In this case, considering interference with elastic waves emitted from transducers other than adjacent transducers, the distance L and the frequency f should be determined so that the distance L between each transducer is an integer multiple of v/f.

Figure 4:
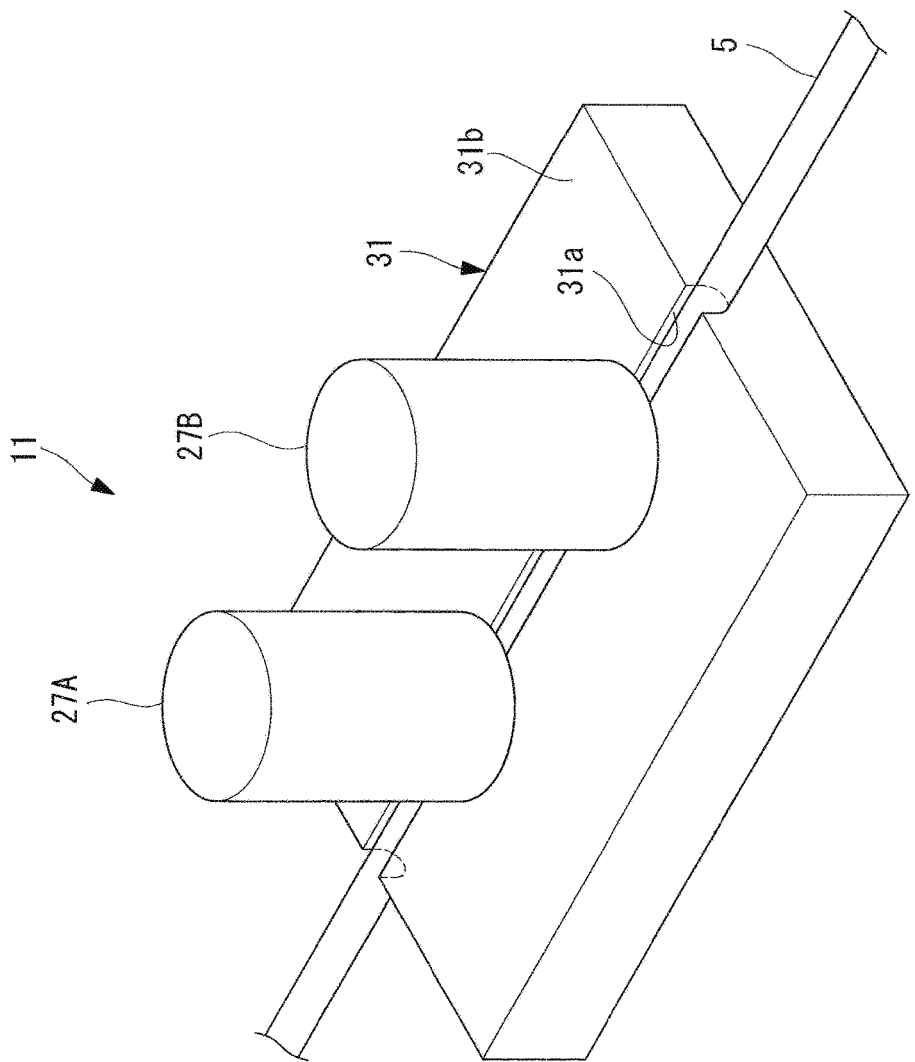
FIG. 4 is a perspective view showing another example of a securing part for securing the transducers and the optical fiber, as a modification of the first embodiment of the present invention.
Figure 5A:
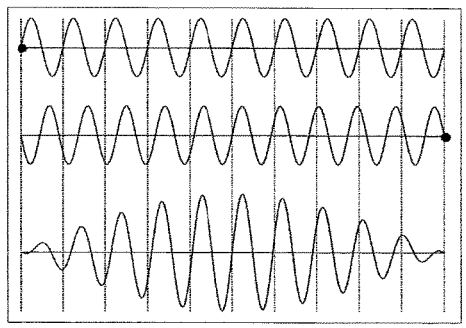
FIG. 5A is an example of data in which the waveform in the driving period of the transducers is plotted so that every $1/10$th time slot contains half of the period, in a case where the frequencies of the driving signals input to the two transducers differ from each other.
Figure 5D:
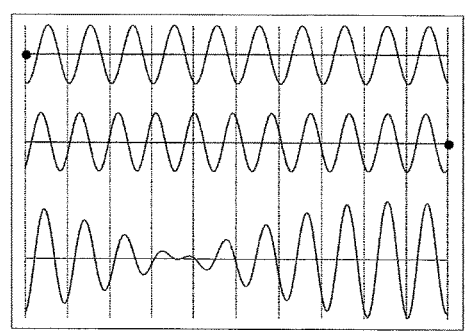
FIG. 5D is an example of data in which the waveform in the driving period of the transducers is plotted so that every $1/10$th time slot contains half of the period, in a case where the frequencies of the driving signals input to the two transducers differ from each other.
Figure 5B:
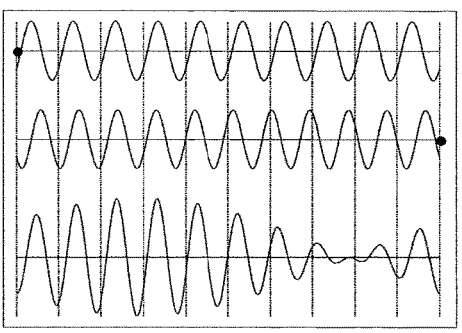
FIG. 5B is an example of data in which the waveform in the driving period of the transducers is plotted so that every $1/10$th time slot contains half of the period, in a case where the frequencies of the driving signals input to the two transducers differ from each other.
Figure 5E:
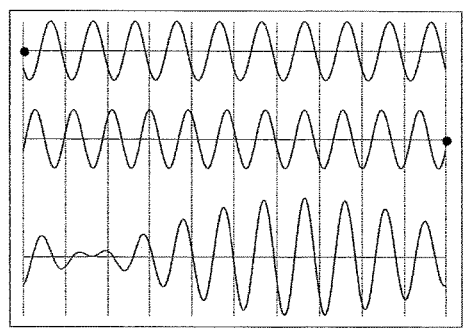
FIG. 5E is an example of data in which the waveform in the driving period of the transducers is plotted so that every $1/10$th time slot contains half of the period, in a case where the frequencies of the driving signals input to the two transducers differ from each other.
Figure 5C:
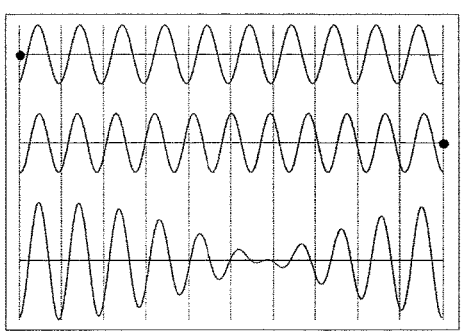
FIG. 5C is an example of data in which the waveform in the driving period of the transducers is plotted so that every $1/10$th time slot contains half of the period, in a case where the frequencies of the driving signals input to the two transducers differ from each other.
Figure 5F:
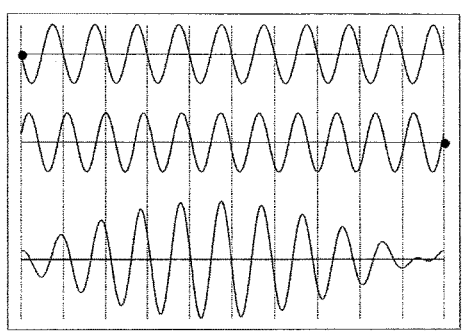
FIG. 5F is an example of data in which the waveform in the driving period of the transducers is plotted so that every $1/10$th time slot contains half of the period, in a case where the frequencies of the driving signals input to the two transducers differ from each other.

In addition, in this embodiment, it has been assumed that the optical fiber 5 is simply secured on flat end faces of the transducers 27A and 27B; instead of this, however, as shown in FIG. 4, a holding plate 31 having, in one surface 31b thereof, an elongated groove 31a in which the optical fiber 5 can be inserted may be employed.

In this case, so that the optical fiber 5 is laid in the groove 31a in the holding plate 31 and is pushed in the depth direction of the groove 31a by one of the end faces of each of the transducers 27A and 27B, the transducers 27A and 27B should be disposed above the surface 31b of the holding plate 31.

In addition, it suffices that the transducers 27A and 27B are secured to the holding plate 31 by pushing them thereagainst with a pressing member (not illustrated), or that the transducers 27A and 27B are secured to the holding plate 31 with an adhesive. Furthermore, it suffices that gaps between the optical fiber 5 and the transducers 27A and 27B be filled with an ultrasonic couplant or the like, so that the optical fiber 5 and the transducers 27A and 27B are placed in tight contact.

Second Embodiment

Next, a microscope system according to a second embodiment of the present invention will be described.

The microscope system 1 according to this embodiment differs from that in the first embodiment in that the control device 13 controls the cycle time at which at least one of the frequency, intensity, and phase of the elastic waves emitted from the mode-scrambling device 11 is controlled.

In the following, parts having the same configuration as those in the microscope system 1 according to the first embodiment are assigned the same reference signs, and a description thereof is omitted.

The processor executes the driving program stored in the memory, whereby the control device 13 inputs driving signals of frequencies having different values from each other to the transducers 27A and 27B and subjects at least one of the driving signals to at least one of amplitude modulation, frequency modulation, and phase modulation.

First, the case where the control device 13 inputs driving signals of frequencies having different values from each other to the transducers 27A and 27B will be described.

The frequencies of the driving signals for the two transducers 27A and 27B are defined as $f1$ and $f2$ ($f1 \neq f2$), and the distance L between the transducers 27A and 27B is defined as $L=10v/f1$. In addition, the frequency $f2$ of the driving signal input to the transducer 27B has the relationship $f2=1.1f1$. Schematic diagrams of the elastic waves that propagate when each of the transducers 27A and 27B is driven under these conditions are shown in FIGS. 5A to 5F. FIGS. 5A to 5F are figures in which the waveform of the driving period for the transducer 27A is plotted so that every 1/10th time slot contains half of the period.

In FIGS. 5A to 5F, in order from the top of the figure, the first stage shows the elastic wave that propagates from the transducer 27A, the second stage shows the elastic wave the propagates from the transducer 27B, and the third stage shows the combined wave formed from these elastic waves, and the combined wave in the third stage is the elastic wave that actually propagates in the optical fiber 5. In FIGS. 5A to 5F, the black circles on the waveforms in the first and second stages indicate transducers that are the vibration sources, showing that the elastic waves emitted from the transducer 27A travel towards the right in the figure, and the elastic waves emitted from the transducer 27B travel towards the left in the figure.

With the microscope system 1 configured in this way, as shown in FIGS. 5A to 5F, the interference fringes formed by the two elastic waves having different frequencies, emitted from the transducers 27A and 27B, beat, so that the position at which the amplitude is large moves with time. By generating such beats, it is possible to temporally change the position at which the amplitude of the elastic waves is large, and compared with a case where standing waves are propagated in the optical fiber 5, the refractive index changes in the optical fiber 5 are more complex, and it is thus possible to improve the mode-scrambling effect.

The beat frequency is $|f1-f2|$. In image-capturing with the camera 21, it is preferable to set the frequencies $f1$ and $f2$ of the driving signals so that the beat period becomes shorter than the exposure time. In other words, it is preferable to satisfy the relationship $1/|f1-f2| <$ exposure time. Also, in the case where the beats can be heard as an audible sound, the frequencies $f1$ and $f2$ of the driving signals should be set so as to satisfy the condition $|f1-f2| > 20$ kHz.

Next, the case where the control device 13 subjects at least one of the driving signals to amplitude modulation will be described.

The frequencies of the driving signals for the two transducers 27A and 27B are defined as the same frequency f, and the distance L between the transducers 27A and 273 is defined as $L=10v/f$. FIGS. 6A to 6F show schematic diagrams of the elastic waves that propagate in the case where the driving signal for one of the transducers 27B is amplitude modulated at frequency $f/10$. FIGS. 6A to 6F show, in order, plots of the waveforms every 1/4 period of the driving signals for the transducers 27A and 27B.

As shown in FIGS. 6A to 6F, as the elastic waves propagate from the transducer 27B, the interference fringes also move towards the left in the figure with time. Since the frequencies of the driving signals for the transducers 27A and 27B are the same as each other, more complex interference fringes are formed compared with the case where beats are generated by making the frequencies of the driving signals different.

Figure 6A:
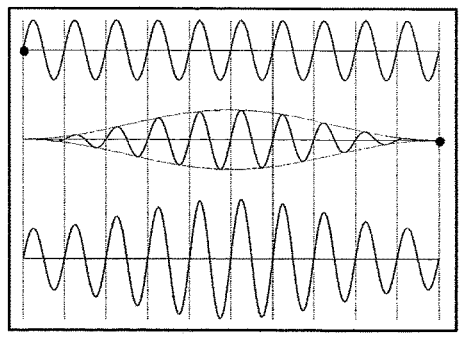
FIG. 6A is an example of data in which the waveform is plotted for every ¼ period of the driving period of the transducers, in the case where amplitude modulation is performed on the driving signal input to one of the transducers.
Figure 6D:
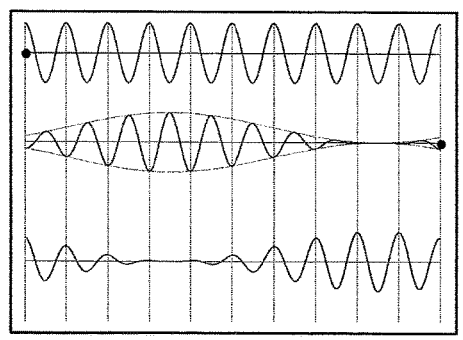
FIG. 6D is an example of data in which the waveform is plotted for every ¼ period of the driving period of the transducers, in the case where amplitude modulation is performed on the driving signal input to one of the transducers.
Figure 6B:
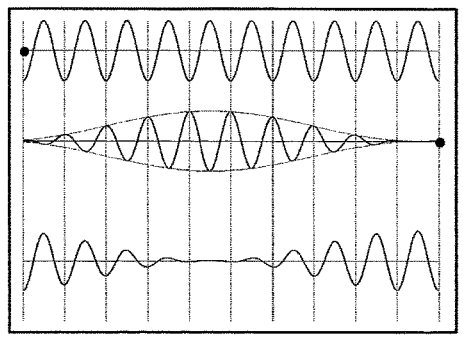
FIG. 6B is an example of data in which the waveform is plotted for every ¼ period of the driving period of the transducers, in the case where amplitude modulation is performed on the driving signal input to one of the transducers.
Figure 6E:
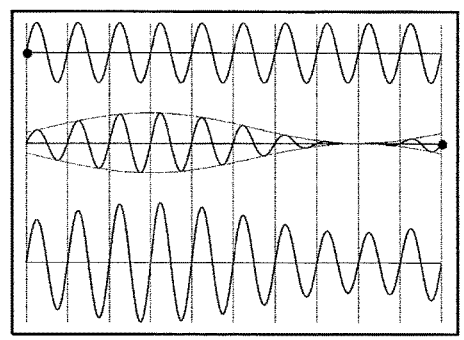
FIG. 6E is an example of data in which the waveform is plotted for every ¼ period of the driving period of the transducers, in the case where amplitude modulation is performed on the driving signal input to one of the transducers.
Figure 6C:
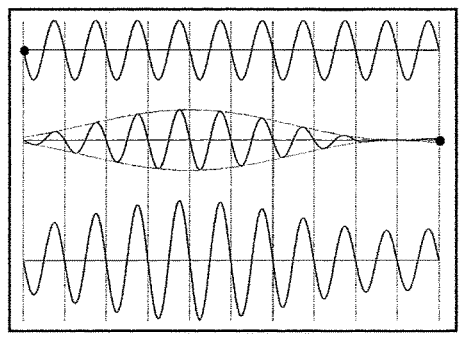
FIG. 6C is an example of data in which the waveform is plotted for every ¼ period of the driving period of the transducers, in the case where amplitude modulation is performed on the driving signal input to one of the transducers.
Figure 6F:
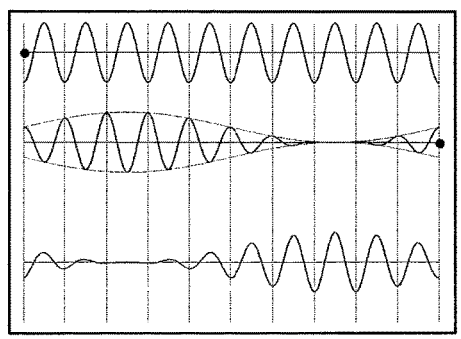
FIG. 6F is an example of data in which the waveform is plotted for every ¼ period of the driving period of the transducers, in the case where amplitude modulation is performed on the driving signal input to one of the transducers.

In addition, as shown in FIGS. 6B, 6D, and 6F, under the condition that the phases of the elastic waves from the transducers 27A and 27B are inverted, at the point where the amplitude of the elastic waves from the transducer 27B is large, the size of the interference fringes is small, and at the point where the amplitude of the elastic waves from the transducer 27B is small, the elastic waves from the transducer 27A are dominant, and thus there is no relationship between the phases of the two elastic waves, and the change in amplitude of the interference fringes (combined wave) is small.

In other words, elastic waves whose amplitude changes greatly at positions where the amplitude of the modulated elastic waves is large and whose amplitude does not change much at positions where the amplitude of the modulated elastic waves is small are propagated. Thus, the positions at which the change in amplitude is large and the position at which it is small move towards the left in the figure with time.

Therefore, with the microscope system 1 configured in this way, by temporally changing the position at which the change in amplitude of the elastic waves becomes large, it is possible to obtain a complex mode-scrambling effect. In addition, it is possible to adjust the mode-scrambling effect in accordance with the observation conditions, such as the wavelength of the laser light from the light-source apparatus 3 and the exposure time and frame rate of the microscope 7.

Regarding the relationship between the frequencies of the driving signals for the transducers 27A and 27B and the exposure time for image-capturing by the camera 21, it is preferable that the modulation period of the transducer 27B be set shorter than the exposure time of the camera 21. In addition, it is preferable that the modulation frequency of the transducer 27B be set to 20 kHz or higher. By doing so, it is possible to prevent the generation of audible sounds due to the modulation.

In this embodiment, although it has been assumed that the amplitude of the driving signal for the transducer 27B is modulated, the amplitude of the driving signal for the transducer 27A may be modulated, or the amplitudes of the driving signals for both transducers 27A and 27B may be modulated. In addition, the frequency or phase of the driving signals of at least one of the transducers 27A and 27B may be modulated. Also in the case where the frequency or phase of the driving signal is modulated, it is possible to obtain the same effect as in this embodiment, where the amplitude of the driving signal is modulated.

Each of the above embodiments may be modified in the following ways.

Figure 7:
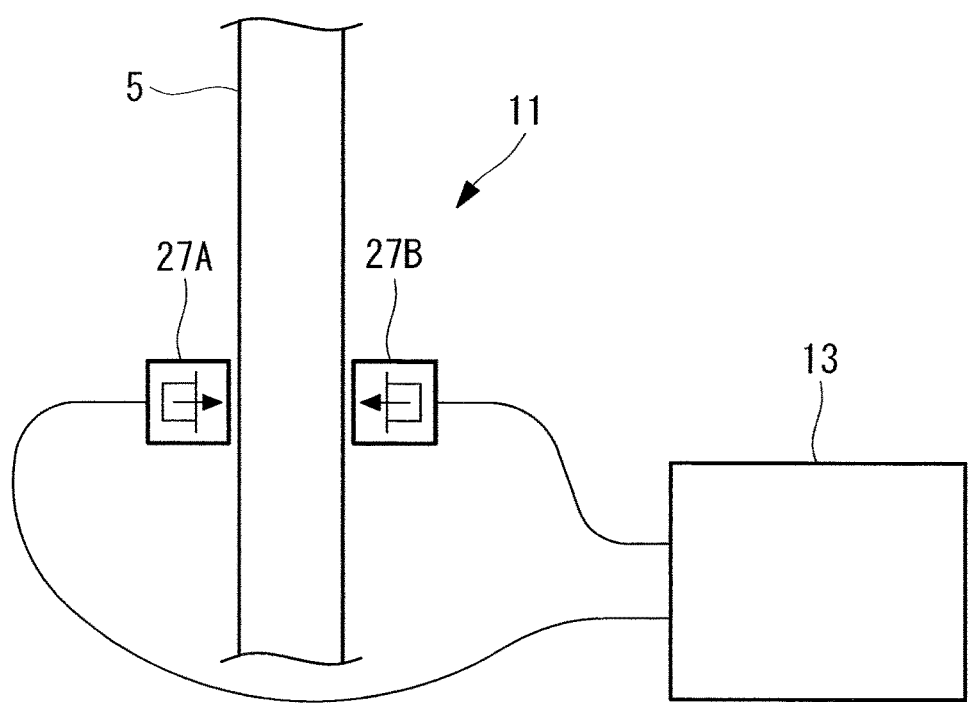
FIG. 7 is a schematic diagram showing the configuration of a mode-scrambling device in a first modification of the first embodiment and the second embodiment of the present invention.

In each of the above embodiments, although the two transducers 27A and 27B are disposed along the longitudinal direction of the optical fiber 5, as a first modification, as shown in FIG. 7, the two transducers 27A and 27B may be disposed so as to sandwich the optical fiber 5 in the radial direction. Thus, elastic waves may be propagated in the radial direction with respect to the optical fiber 5 by each of the transducers 27A and 27B, and elastic wave interference fringes may be formed in the radial direction of the optical fiber 5.

In this case, an end face, in the central axis direction, of each of the transducers 27A and 27B may be directly secured to the optical fiber 5 with an adhesive or a pressing member. In addition, as in the first embodiment, the frequencies of the driving signals for the transducers 27A and 27B may be the same, or the driving signals for the transducers 27A and 27B may have different frequencies, or at least one of the amplitude, frequency, and phase of at least one of the driving signals may be modulated. In such a case also, it is possible to obtain the same effect as in each of the above-described embodiments.

Figure 8:
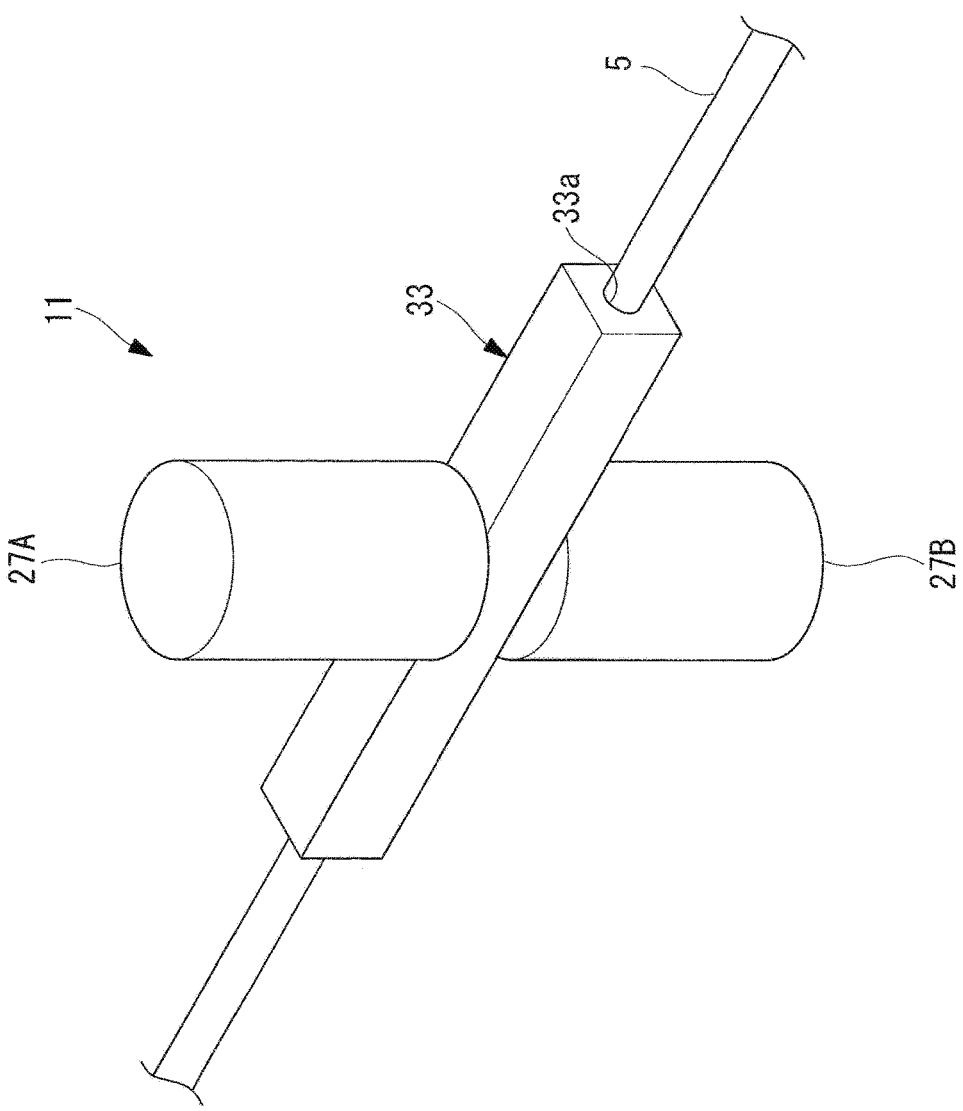
FIG. 8 is a perspective view showing another example of a securing part in FIG. 7, for securing the two transducers and the optical fiber.

In this embodiment, as shown in FIG. 8, for example, an approximately angular cylindrical holding member 33 having a through-hole 33a that passes therethrough in the longitudinal direction to allow the optical fiber 5 to be inserted therein may be employed. Then, in the state in which the optical fiber 5 is inserted into the through-hole 33a in the holding member 33, the transducers 27A and 27B may be secured to mutually opposing side faces of the holding member 33.

In the example in FIG. 8, it suffices that the transducers 27A and 27B are secured by pressing them against the holding member 33 with a pressing member, or that the transducers 27A and 27V be secured to the holding member 33 with an adhesive. In addition, the gap between the optical fiber 5 and the through-hole 33a in the holding member 33 and the gap between the holding member 33 and the transducers 27A and 27B may be filled with ultrasonic couplant or the like, so that they are placed in tight contact with each other.

In this modification, a plurality of sets each consisting of the two transducers 27A and 27B disposed so as to sandwich the optical fiber 5 in the radial direction may be disposed at prescribed intervals along the longitudinal direction of the optical fiber 5. By doing so, the mode-scrambling effect can be improved. In this case, in each set of transducers 27A and 27B, it is preferable that the positions in the circumferential direction at which the transducers 27A and 27B are disposed relative to the central axis of the optical fiber 5 be different from each other.

Figure 9:
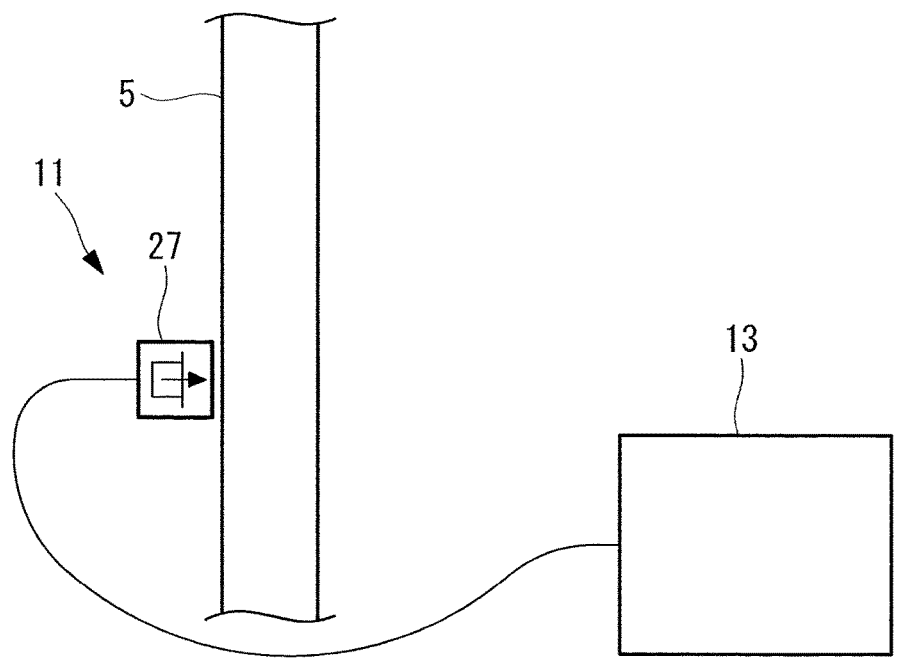
FIG. 9 is a schematic diagram showing the configuration of a mode-scrambling device according to a second modification of the first embodiment and the second embodiment of the present invention.

As a second modification, as shown in FIG. 9, for example, only a single transducer 27 may be employed, and elastic waves may be made to propagate in the radial direction relative to the optical fiber 5 by this transducer 27. Thus, interference fringes (standing wave) may be formed in the radial direction of the optical fiber 5 due to interference between the elastic wave emitted from the transducer 27 and a reflected wave formed by this elastic wave being reflected back at the inner surface on the opposite side, in the radial direction, of the optical fiber 5.

In this case too, the driving signal for the transducer 27 may be subjected to at least one of amplitude modulation, frequency modulation, and phase modulation. By doing so, it is possible to perform more complex mode scrambling. In addition, another transducer 27 may be added at a different position in the longitudinal direction of the optical fiber 5. By doing so, the mode-scrambling effect can be improved. In this case too, it is preferable that the positions, in the circumferential direction, at which the transducers 27 are disposed relative to the central axis of the optical fiber 5 be different from each other.

To efficiently reflect the elastic waves (ultrasonic waves) at the interface of materials, it is necessary to make the acoustic impedance difference between the materials at the reflecting surface large. With this aim, a member that reflects the elastic waves may be provided on the opposite side from the transducer 27, sandwiching the optical fiber 5 therebetween. The acoustic impedance of air is extremely small in comparison with the acoustic impedance of a solid, and thus, the reflectance of elastic waves at the interface between air and a solid is generally high. Therefore, in the case where the optical fiber 5 is covered with an adhesive or cladding, such an adhesive or cladding is not used at positions where a high reflectance is desired, so that the surface of the optical fiber 5 is in contact with air, or a member that reflects elastic waves is provided thereat, whereby it is possible to efficiently reflect the elastic waves, thus forming elastic wave interference fringes in the optical fiber 5.

Embodiments of the present invention have been described above with reference to the drawings; however, the specific configuration is not limited to these embodiment, and design changes and so forth that do not depart from the scope of the present invention are also encompassed. For example, the present invention is not limited to each of the above-described embodiments and modifications thereof and may be applied to embodiments in which these embodiments and modifications are appropriately combined, without being particularly limited.

As a result, the following forms are derived from the above-described embodiments.

One aspect of the present invention is a microscope system including: an optical fiber in which illumination light emitted from a light source propagates; a microscope that irradiates a specimen with the illumination light propagated via the optical fiber and that obtains an image of the specimen; an interference-fringes forming portion that causes elastic waves to propagate in the optical fiber to form interference fringes of the elastic waves in the optical fiber; and a control unit that controls driving of the interference-fringes forming portion.

With the microscope system according to the above-described form of the present invention, the illumination light emitted from the light source propagates to the microscope via the optical fiber, and the specimen is irradiated with the illumination light by the microscope, thus obtaining an image. In this case, the interference-fringes forming section is driven by the control unit so that elastic waves are made to propagate in the optical fiber, forming interference fringes, whereby the refractive index of the optical fiber is changed, and it is possible to make the illumination light emitted from the optical fiber uniform by means of the so-called mode-scrambling effect.

Here, since the optical fiber is not mechanically deformed and vibrations are not applied to the optical fiber, the generation of sound or vibrations, which would influence observation, can be suppressed, and damage to the optical fiber can be reduced. In addition, it is possible to make the mode-scrambling effect adjustable by controlling the driving of the interference-fringes forming portion with the control unit. Accordingly, the mode-scrambling effect is efficiently utilized with a simple configuration, thus realizing reduced damage to the optical fiber, uniform laser light irradiation on the specimen surface, and removal of spectral noise, which enable high-precision observation of the specimen.

The above-described microscope system may be configured so that the interference-fringes forming portion generates the elastic waves with a frequency of 20 kHz or higher.

With this configuration, even if the elastic waves leak out from the interference-fringes forming portion, the generation of audible sound is suppressed, and user discomfort can be prevented.

The above-described microscope system may be configured so that the control unit periodically changes at least one of the frequency, intensity, and phase of the elastic waves emitted from the interference-fringes forming portion.

With this configuration, the refractive index changes in the optical fiber become more complex, and it is possible to improve the mode-scrambling effect. In addition, the mode-scrambling effect can be adjusted in accordance with the observation conditions, such as the wavelength of the illumination light from the light source and the exposure time and frame rate of the microscope.

The above-described microscope system may be configured so that the microscope includes an image-acquisition unit that captures observation light from the subject, which the illumination light irradiates, to produce the image, and the control unit controls the cycle time at which at least one of the frequency, intensity, and phase of the elastic waves is changed, according to an exposure time of the image-acquisition unit.

With this configuration, elastic waves in a frequency band in accordance with the exposure time of the image-acquisition unit are made to propagate in the optical fiber by the interference-fringes forming portion, and it is possible to obtain an adequate mode-scrambling effect for performing observation.

In the above-described microscope system, the interference-fringes forming portion may be an electromechanical conversion element that can convert an electrical signal to ultrasonic waves.

The above-described microscope system may be configured so that the control unit controls the timing at which elastic waves are generated by the interference-fringes forming portion.

With this configuration, elastic waves can be generated in the interference-fringes forming portion, for example, only at the time of image-capturing or observation, the load exerted on the optical fiber can be further reduced, and damage to the optical fiber can be suppressed.

The present invention affords an advantage in that the mode-scrambling effect is efficiently utilized with a simple configuration, thus realizing reduced damage to the optical fiber, uniform laser light irradiation on the specimen surface, and removal of spectral noise, which enable high-precision observation of the specimen.

REFERENCE SIGNS LIST 1 microscope system
3 light source apparatus (light source)
5 optical fiber
7 microscope
11 mode-scrambling device (interference-fringes forming unit)
13 control device (control unit)
21 camera (image-acquisition unit)
S specimen

The invention claimed is:

1. A microscope system comprising:
   an optical fiber in which illumination light emitted from a light source propagates;
   a microscope that irradiates a specimen with the illumination light propagated in the optical fiber and that obtains an image of the specimen;
   an interference-fringes forming portion that causes elastic waves to propagate in the optical fiber to form interference fringes of the elastic waves in the optical fiber; and
   a control unit that controls driving of the interference-fringes forming portion.

2. A microscope system, comprising:
   an optical fiber in which illumination light emitted from a light source propagates;
   a microscope that irradiates a specimen with the illumination light propagated in the optical fiber and that obtains an image of the specimen;
   an interference-fringes forming portion that causes elastic waves to propagate in the optical fiber to form interference fringes of the elastic waves in the optical fiber; and
   a control unit that controls driving of the interference-fringes forming portion,
   wherein the interference-fringes forming portion generates the elastic waves with a frequency of 20 kHz or higher.

3. The microscope system according to claim 1, wherein the control unit periodically changes at least one of a frequency, an intensity, and a phase of the elastic waves which are emitted from the interference-fringes forming portion.

4. The microscope system according to claim 3, wherein the microscope includes an image-acquisition unit that captures observation light from the specimen, which the illumination light irradiates, to produce the image, and
   wherein the control unit controls a cycle time at which at least one of the frequency, the intensity, and the phase of the elastic waves is changed, according to an exposure time of the image-acquisition unit.

5. A microscope system comprising:
   an optical fiber in which illumination light emitted from a light source propagates;
   a microscope that irradiates a specimen with the illumination light propagated in the optical fiber and that obtains an image of the specimen;
   an interference-fringes forming portion that causes elastic waves to propagate in the optical fiber to form interference fringes of the elastic waves in the optical fiber; and
   a control unit that controls driving of the interference-fringes forming portion,
   wherein the interference-fringes forming portion comprises an electromechanical conversion element that can convert an electrical signal to ultrasonic waves.

6. The microscope system according to claim 1, wherein the interference-fringes forming portion generates the elastic waves.

7. The microscope system according to claim 6, wherein the control unit controls a timing at which the elastic waves are generated by the interference-fringes forming portion.

8. A microscope system comprising:
   an optical fiber in which illumination light emitted from a light source propagates;

a microscope that irradiates a specimen with the illumination light propagated in the optical fiber and that obtains an image of the specimen;

a transducer that excites elastic waves in the optical fiber to form interference fringes of the elastic waves in the optical fiber; and a controller that controls driving of the transducer.

9. The microscope system according to claim 8, wherein the controller periodically changes at least one of a frequency, an intensity, and a phase of the elastic waves excited by the transducer.

10. The microscope system according to claim 9, wherein the microscope includes a camera that captures observation light from the specimen, which the illumination light irradiates, to produce the image, and wherein the controller controls a cycle time at which at least one of the frequency, the intensity, and the phase of the elastic waves is changed, according to an exposure time of the camera.

11. The microscope system according to claim 8, wherein the controller controls a timing at which the elastic waves are excited by the transducer.

\* \* \* \* \*